United States Patent [19]
Radomski et al.

[11] Patent Number: 5,355,983
[45] Date of Patent: Oct. 18, 1994

[54] ELECTRONICALLY CONTROLLED ROTATIONAL CONTROL APPARATUS

[75] Inventors: James V. Radomski, New Brighton; Richard G. Christensen, Brooklyn Park, both of Minn.

[73] Assignee: Horton Manufacturing Co., Inc., Minneapolis, Minn.

[21] Appl. No.: 88,240

[22] Filed: Jul. 7, 1993

[51] Int. Cl.⁵ .................. F16D 23/04; F16D 25/10; F16D 43/286
[52] U.S. Cl. .................. 192/56 F; 192/87.11; 192/87.15; 192/150
[58] Field of Search .................. 192/48.3, 48.9, 56 F, 192/87.11, 87.15, 150, 87.18

[56] References Cited

U.S. PATENT DOCUMENTS

| | | | |
|---|---|---|---|
| 2,783,628 | 3/1957 | Hallewell | 192/56 F |
| 3,497,046 | 2/1970 | Schilling | 192/85 C A |
| 4,081,063 | 3/1978 | Malmros et al. | |
| 4,110,768 | 8/1978 | Numata | 192/150 X |
| 4,378,061 | 3/1983 | Schierling et al. | 192/56 F |
| 4,609,089 | 9/1986 | Kobayashi et al. | 192/150 X |
| 4,629,045 | 12/1986 | Kasai et al. | |
| 4,662,492 | 5/1987 | Troeder | 192/150 X |
| 4,722,426 | 2/1988 | Bellanger | |
| 4,723,624 | 2/1988 | Kawasaki et al. | 192/48.3 X |
| 4,734,861 | 3/1988 | Bertolasi et al. | |
| 4,770,281 | 9/1988 | Hanks | 192/56 F |
| 4,825,992 | 5/1989 | Skrobisch | |
| 4,838,400 | 6/1989 | Fortune | |
| 4,848,546 | 7/1989 | McCormick et al. | |
| 4,858,740 | 8/1989 | Hansen | |
| 4,884,670 | 12/1989 | McCormick et al. | |
| 4,903,804 | 2/1990 | Beccaris et al. | |
| 4,930,608 | 6/1990 | Schenk et al. | |
| 4,934,500 | 6/1990 | Hanks et al. | |
| 4,960,190 | 10/1990 | Fortune et al. | |
| 5,014,832 | 5/1991 | Satoh et al. | |
| 5,030,865 | 7/1991 | Rockey et al. | |
| 5,054,588 | 10/1991 | Thorp et al. | |

Primary Examiner—Rodney H. Bonck
Attorney, Agent, or Firm—Peterson, Wicks, Nemer & Kamrath

[57] ABSTRACT

An apparatus (10) is disclosed including a friction clutch (12) and an overload apparatus (14) connected in parallel between an input (16) and an output (18). Encoders (20, 22) are provided for separately detecting the rotational positions of the input (16) and the output (18). A microcomputer controller (580) controls actuation of the friction clutch (12) and the overload apparatus (14) in response to the rotational positions detected by the encoders (20, 22) allowing the clutch (12) to bring the output (18) to be generally aligned with a select rotational position of the input (16) at which time the overload apparatus (14) can be actuated to rotatably relate the input (16) and the output (18) at the select rotational position and actuation of the clutch (12) can be removed. The microcomputer controller (580) also removes actuation of the overload apparatus (14) when the encoders (20, 22) detect rotation of the input (16) relative to the output (18) from the select rotational position. In the most preferred form, the encoders (20, 22) include codewheels (500, 501) rotatable with the input (16) and the output (18), respectively, and relative to slotted optical switches (502-505), with the codewheels (500, 501) including 64 evenly spaced slots which rotate past the slotted optical switches (502-505).

16 Claims, 3 Drawing Sheets

ELECTRONICALLY CONTROLLED ROTATIONAL CONTROL APPARATUS

BACKGROUND

The present invention generally relates to rotational control apparatus, particularly to rotational control apparatus for informationally relating and, at times connecting with particular position registration an output to an input, at least one of which is rotating, and in the preferred form shown, with a single position registration between the input and output, and specifically to rotational control apparatus for connecting an output to an input, at least one of which is continuously rotating, and also for allowing overload protection.

U.S. Pat. No. 4,770,281 discloses an overload apparatus of the ball-detent type which has achieved considerable commercial success and which provides crisp, repeatable disengagement at a preset torque level which is a linear function of the applied air pressure. After a disengagement, however, the input to the overload apparatus must be completely stopped and the overload apparatus manually engaged before the driven machinery can be restarted. This presently requires time and human intervention in addition to requiring the machine to be shut down. Serious difficulties can arise from shutting down a machine. For example, the output to be connected will typically have significant inertia and must again be accelerated to "linespeed" in such a way that avoids damage to either the output load, the drive power source, or the specific torque overload apparatus being used. Although it would be possible (as is often done) to accelerate the output load to proper speed with an auxiliary drive, the problem of locating correct relative angular position remains and also the overload apparatus cannot be engaged without damage until such registry is located. Furthermore, locating the necessary relative rotational position can be time consuming since typical inertial values may require differential speeds on the order of one RPM or less so as to avoid interface damage at engagement of the overload apparatus. Hunting for registry at one relative RPM or less can obviously take 60 seconds or more with the potentiality of a miss, after which the apparatus would again be subjected to an additional 60 seconds or more of seek/search time.

Thus, a need exists for apparatus having the ability to connect or disconnect a load to or from a source of rotational power which is rotating at a speed, now preferably in the range of 15 to 3,600 RPM, while at the same time providing position registration and/or information, and in the most preferred form which provides position registration at a single rotational position. Additionally, a need exists for such an apparatus which can provide overload protection of the output.

SUMMARY

The present invention solves these needs and other problems in the field of rotation control by providing, in the preferred form, apparatus and method for connecting an output to an input at select rotational positions while the input continues to rotate without stopping. Particularly, the input and output are initially rotatably related by a first rotational control apparatus independent of the relative rotational positions of the input and output such as by a friction clutch. The rotational positions of the input and output are separately detected such as by the use of encoders each including a codewheel having peripheral, evenly spaced slots which rotate past first and second slotted optical switches. In response to the relative rotational positions of the input and output, a second rotational control apparatus is actuated by a controller when the input and the output are aligned in the select rotational position.

In other aspects of the present invention, overload protection is provided by the second rotational control apparatus, with actuation of the first rotational control apparatus being removed when the second rotational control apparatus is actuated and actuation of the second rotational control apparatus being removed when relative rotation of the input and output is detected from the select rotational position.

In preferred aspects of the present invention, actuation of the rotational control apparatus is by fluid pressure, with the controller electronically controlling valves for the fluid pressure.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
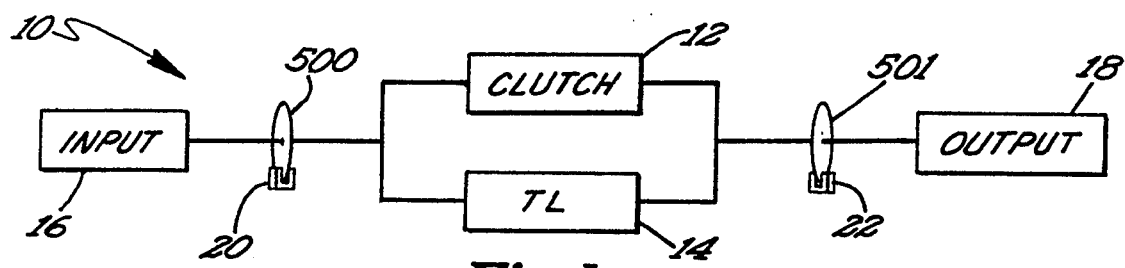
FIG. 1 shows a diagrammatic view of a device for connecting and disconnecting a rotatable output to and from a rotatable input for transferring rotational motion between the input and the output and while at least one of the input and output are continuously rotating according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "side", "radial", "circumferential", "clockwise", "counter-clockwise", and similar terms are used herein, it should be understood that these terms have reference only to the structure shown in the drawings as it would appear to a person viewing the drawings and are utilized only to facilitate describing the invention.

DESCRIPTION

Figure 2:
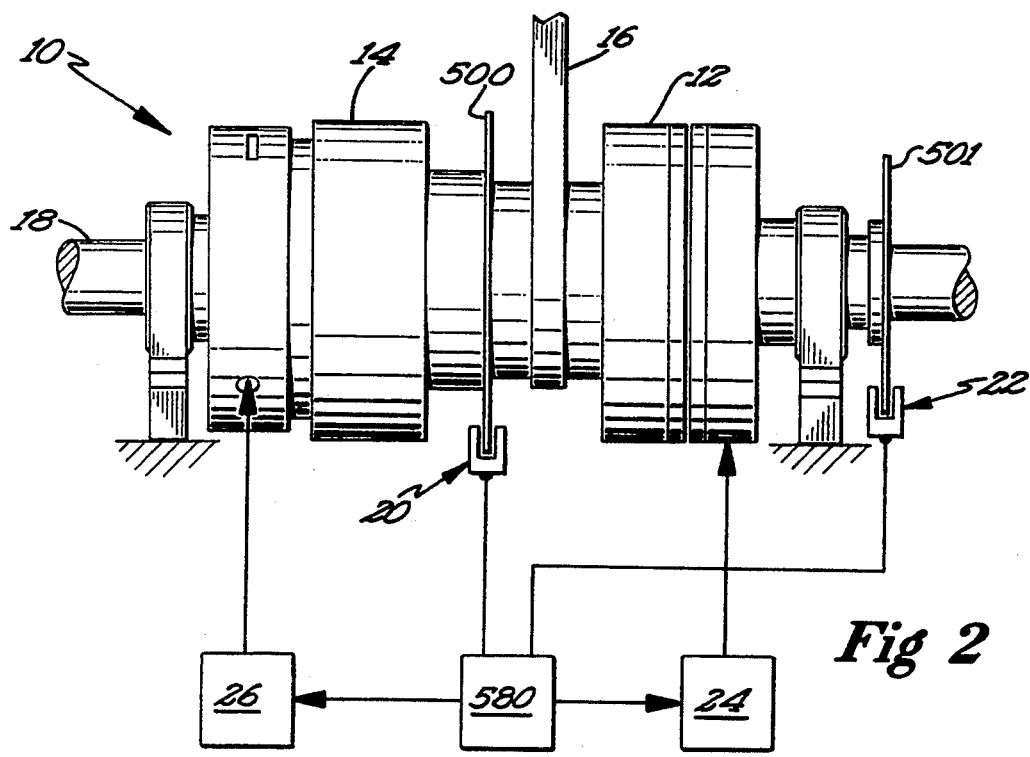
FIG. 2 shows a further diagrammatic view of the device of FIG. 1 including a block diagram of the electronic controls therefor.
Figure 4:
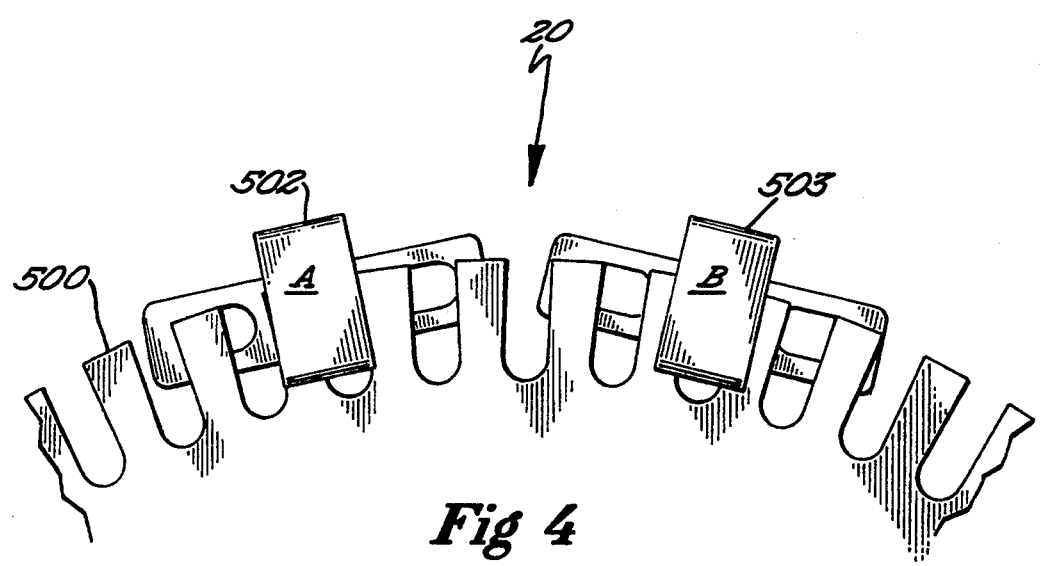
FIG. 4 shows a side view of a codewheel and slotted optical switches of an encoder of the device of FIGS. 1 and 2.

Device or apparatus for connecting and disconnecting an output load to or from an input source, at least one or both of which are continuously rotating, while at the same time providing position registration and/or information and also overload protection according to the preferred teachings of the present invention is shown in the drawings and generally designated 10. Device 10, in a preferred embodiment, generally includes a friction clutch 12 of any conventional design such as the type shown and described in U.S. Pat. No. 3,497,046. Device 10, in a preferred embodiment, further includes an overload apparatus 14 of any conventional design such as the type shown and described in U.S. Pat. No. 4,770,281. In the most preferred form, apparatus 14 provides rotational position registration, such as a single position registration. Clutch 12 and apparatus 14 are connected in parallel as diagrammatically shown in FIG. 1, in a preferred embodiment, such that either or both may transmit rotational power from a source or input 16 to a load or output 18. One arrangement of clutch 12 and overload apparatus 14 is shown in FIG. 2 wherein clutch 12 and overload apparatus 14 are mounted on a through shaft which comprises output 18. The output sides of clutch 12 and overload apparatus 14 are then rotatably related and rotate with the through shaft comprising output 18 whereas the input sides of clutch 12 and overload apparatus 14 which are connected together are rotatably mounted relative to the through shaft comprising output 18. The input sides of clutch 12 and overload apparatus 14 are then rotated by a timing belt drive or other positive displacement power transmission device such as but not limited to a chain drive which comprises input 16. However, it can be appreciated that the through shaft could comprise input 16 and the belt or other drive comprises output 18, if desired.

It can then be appreciated that clutch 12 is able to selectively rotatably relate input 16 to output 18 independent of the relative rotational positions and speeds of input 16 and output 18 at engagement or actuation whereas overload apparatus 14 can only selectively rotatably relate input 16 to output 18 only when input 16 and output 18 are rotating at relatively the same speeds and only at select rotational positions of input 16 relative to output 18 such as at a single rotational position of engagement or actuation which in conventional use is when input 16 and output 18 are both stopped.

Device 10 further includes provisions 20, in a preferred embodiment, such as an optical shaft encoder for detecting the angular position of input 16 and also provisions 22, in a preferred embodiment, for detecting the angular position of output 18. Device 10, in a preferred embodiment, further includes valves 24 and 26 which are electrically controlled for supplying compressed fluid such as air to clutch 12 and also to overload apparatus 14, respectively, at pressures which can be adjusted by the operator.

Device 10, in a preferred embodiment, further includes a microcomputer-based electronic controller 580 which receives digital signals from each of encoders 20 and 22 and receives input commands from the operator or another control system, and sends commands to valves 24 and 26.

Each encoder 20 and 22, in a preferred embodiment, consists of first slotted optical switches 502 and 504, and second slotted optical switches 503 and 505 and a codewheel 500 and 501, respectively. Codewheels 500 and 501 are manufactured parts and may be of plastic, metal, etc., in the preferred embodiment, and in the most preferred form described include 64 evenly spaced slots at their optical circumference. Slotted optical switches 502–505 are mounted appropriately with respect to each codewheel 500 and 501. Slotted switches 502–505 used in the preferred embodiment are manufactured by Optek Technology and are type OPB930W55.

Figure 3:
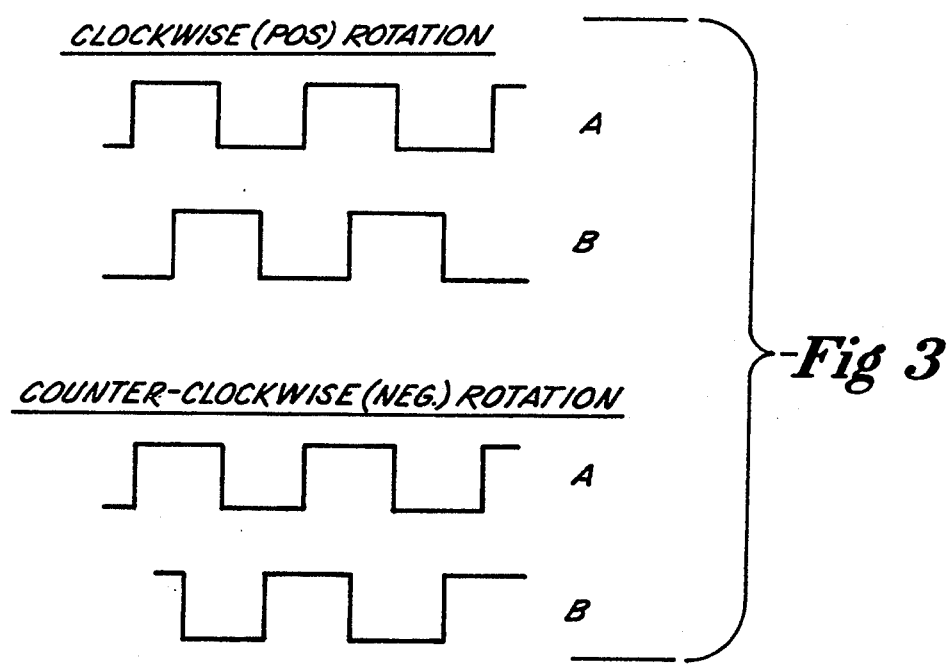
FIG. 3 shows electronic wave forms of the device of FIGS. 1 and 2.
Figure 5:
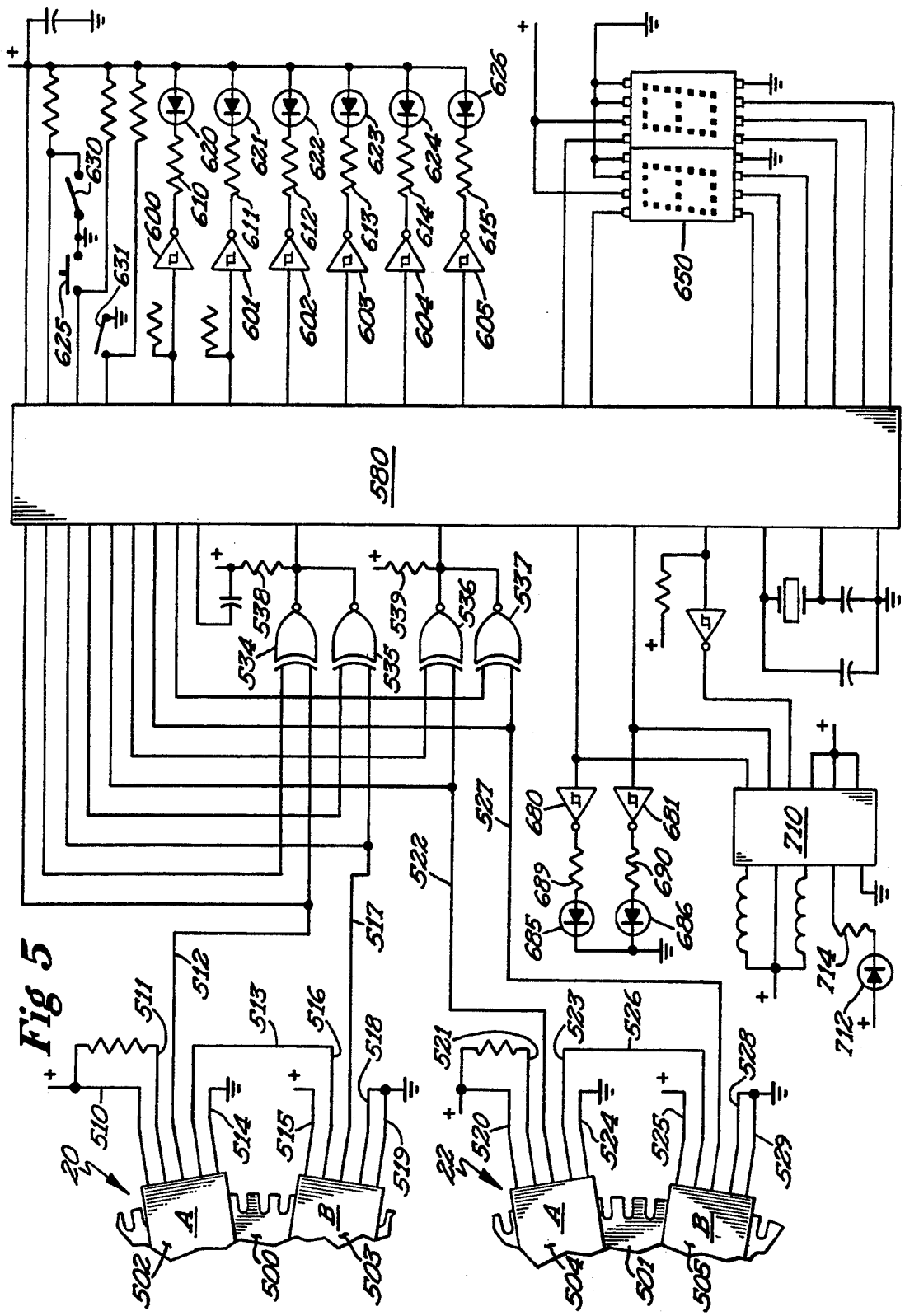
FIG. 5 shows a schematic/diagrammatic view of the device of FIGS. 1 and 2.

Each encoder 20 and 22 translates rotary motion into a two-channel digital output. Slotted optical switches 502–505 are aligned with codewheels 500 and 501 such that, when rotating clockwise, a point on codewheel 500 or 501 first passes the slotted optical switch 502 or 504 and then slotted optical switch 503 or 505, respectively. Furthermore, in a preferred embodiment, the digital output of switch 502 or 504 is in quadrature with switch 503 or 505 (90 electrical degrees out of phase) as shown in FIG. 3. The quadrature output is necessary, in a preferred embodiment, if microcomputer controller 580 is to determine the direction of rotation of the individual codewheels 500 and 501 of encoders 20 and 22. For examples as shown in FIGS. 3 and 5 for clockwise (positive) rotation, switch 502 or 504 leads switch 503 or 505 by 90 electrical degrees. Similarly as shown in FIGS. 3 and 5 for counter-clockwise (negative) rotation, switch 503 or 505 leads switch 502 or 504. In the preferred form, slotted optical switches 502–505 are of the non-inverting type—that is, they output a logical 1 when a slot of codewheel 500 or 501 passes through the aperture and also have a built-in Schmitt trigger circuit to provide hysteresis for stability and low-level noise rejection.

Quadrature decoding of the signals coming from slotted optical switches 502–505 of encoders 20 and 22 is performed entirely by microcomputer controller 580. The decoding approach multiplies the resolution of the input signals by a factor of four, thus providing 256 counts per revolution from codewheel 500 or 501 having 64 slots. One count corresponds to an angular displacement of approximately 1.4°, which is presently sufficient resolution for device 10 according to the preferred teachings of the present invention. Of course, higher or lower resolution is within the skill of the art once the teachings of the present invention have been read and understood. However, the ability to represent angular position with a single byte (8 bits) has obvious computational advantages.

Optical switches 502–505 are connected by their respective output wires, designated 512, 517, 522, and 527 in FIG. 5 to the remaining logic of the diagrammatic/schematic of FIG. 5. For example, optical switches 502–505 are connected to logic gates 534, 535, 536, and 537, each of which form one-quarter of a logic gate designated MM74HC266A as manufactured by National Semiconductor.

Encoders 502–505 are configured so that a slot in output codewheels 500 and 501 is a logical one. Optical switches 502–505 and gates 534–537 are further interconnected with microcomputer controller 580. Microcomputer controller 580, in the preferred embodiment, is a single-chip microcomputer and in the preferred form an Intel 87C51.

Microcomputer controller 580 is further interconnected with further logic gates 600, 601, 602, 603, 604, and 605 which function as lamp drivers for indicator lamps 620, 621, 622, 623, 624, and 626, respectively. Logic gates 600–605 each form one-sixth of MM74HC14 manufactured by National Semiconductor.

Logic gates 600–605 are further connected through one kilohm resistors 611, 612, 613, 614, and 615 to indicator lamps 620, 621, 622, 623, 624, and 626.

Indicator 620 indicates the condition of overload apparatus 14, with the lamp on indicating engagement. Indicator 621, when lit, indicates that a disengagement of overload apparatus 14 has occurred as the result of an overload condition. Indicator 622 signifies an input encoder fault. Indicator 623 signifies an output encoder fault. Indicator 624 signifies a drag fault on overload apparatus 14. Indicator 626 signifies a clutch-engage time-out condition.

Further connected to microcomputer controller 580 are switches 625 and 630. Switch 625 is a momentary, normally off switch. Switch 625 is pushed once every time the electronics are energized to provide information to the system as to the zero location, as will be further explained. Switch 630 is a toggle switch which may be thrown to engage clutch 12 of the preferred embodiment of the present invention. Of course, switches 625 and 630, among other parts, may be replaced by logical inputs to the system of the present invention.

Optional hexadecimal display 650 is also provided as an output to microcomputer controller 580. Hexadecimal display 650 is an HDSP-0762 manufactured by Hewlett Packard. Display 650 can display the position of the balls of overload apparatus 14 with respect to its detents. Also connected to microcomputer controller 580 are two further logic gates 680 and 681 which further connect to indicators 685 and 686 through one kilohm resistors 689 and 690, respectively. Indicator 685 is configured to provide a "clutch on" representation. Indicator 686 is configured to provide an "overload apparatus on" representation.

Further interconnected with microcomputer controller 580 is driver 710. Driver 710 is a type DS3669 as manufactured by National Semiconductor. Driver 710 is interconnected with a further indicator 712 through a 150 ohm resistor 714 to provide an indication that clutch 12 is in a "ready" condition.

All indicators are type HLMP-K150 as manufactured by Hewlett Packard except for "ready" indicator 712 which is green, not red, and is Hewlett Packard HLMP-1523.

Various electrical connections are provided to appropriate power, including 510, 511, 515, 520, 521, and 525. Various electrical connections are also provided between parts, including 513, 516, 523, and 526. Also, various electrical connections are provided to electrical ground, including 514, 518, 519, 524, 528, and 529.

The signals from slotted optical switches 502–505 enter microcomputer controller 580 in the preferred form of Intel 87C51 single-chip microcomputer by means of the Port 1 pins and the external interrupt pins NOT INT0 and NOT INT1. The present states of slotted optical switches 502–505 are read by pins P1.0, P1.2, P1.4, and P1.6. The past states of slotted optical switches 502–505 are output by pins P1.1, P1.3, P1.5, and P1.7. Each input signal along with its corresponding past value is fed to the two inputs of one of exclusive-NOR gates 534–537. Exclusive-NOR gates 534–537 act as equality detectors and output a logical 1 only when the two inputs are at the same logic level—in other words, as long as the present state of the appropriate slotted optical switch 502–505 is equal to its past state. Exclusive-NOR gates 534–537 in the preferred form of MM74HC266A made by National Semiconductor have open drain outputs which cannot source current; they can only sink current. By connecting the outputs of exclusive-NOR gates 534–535 together and 536–537 together and adding 10K pullup resistors 538 and 539, a wire-OR function is achieved. In this manner, the signals from exclusive-NOR gates 534 and 535 for input codewheel 500 are combined and connected to external interrupt NOT INT0, while the signals from exclusive-NOR gates 536 and 537 for output codewheel 501 are combined and connected to external interrupt NOT INT1.

The external interrupts are programmed to be edge-sensitive; that is, an interrupt is generated when a 1-to-0 transition (a falling edge) is detected at one of the external interrupt pins. There are two interrupt service routines in the system that process external interrupts. One routine decodes signals from the input encoder (NOT INT0), and the other decodes signals from the output encoder (NOT INT1). These interrupt service routines increment (add 1 to) or decrement (subtract 1 from) an 8-bit position counter read by display 650 (called THETA in microcomputer controller 580) that keeps track of the position of the balls with respect to the detents of overload apparatus 14. The interrupt service routines also control the pins that output the past states of slotted optical switches 502–505. Initially, the past state of each slotted optical switch 502–505 is set equal to its present state. In this condition, the NOT INT0 and NOT INT1 pins are both held at a logic 1 and no external interrupts are generated. Now, if any of the slotted optical switches 502–505 change logic states, an interrupt will be generated. When the appropriate interrupt service routine is vectored to, it examines the Port 1 data to determine which channel made the transition, whether it was a rising edge or a falling edge, and what logic state the remaining channel is in. If the state transition is valid, position counter 650 is either incremented or decremented, depending on the Port 1 data. In addition, the past state of the appropriate slotted optical switch 502–505 is set equal to its present state, thereby returning the appropriate interrupt pin to a logic 1.

To maintain the integrity of position counter 650, short duration noise spikes are rejected and illegal state transitions are detected and flagged as encoder faults. When input codewheel 500 rotates clockwise one count, position counter 650 is incremented. When the input codewheel 500 rotates counter-clockwise one count, position counter 650 is decremented. When output codewheel 501 rotates clockwise one count, position counter 650 is decremented. When output codewheel 501 rotates counter-clockwise one count, position counter 650 is incremented. All of these events happen quite rapidly. For example, when the engaged overload apparatus 14 is rotating at 1,800 RPM, microcomputer controller 580 must process 15,360 interrupts per second.

The method of position sensing just described is an incremental system. Without additional information, it cannot measure absolute position, only changes in absolute position. At some point microcomputer controller 580 needs to be told where home position is. After that, it will always know the position of the balls with respect to the detents of overload apparatus 14 as long as the electronics, including slotted optical switches 502–505, remain powered up. To do this, the operator must manually engage overload apparatus 14 and then press zero switch 625. Notice that device 10 does not need to know the absolute position of the input and output codewheels 500 and 501, only their position relative to each other.

When device 10 receives an engage command, as from switch 630, it must first debounce the signal and make sure that it is a valid command and not just noise. To do this, microcomputer controller 580 waits approximately 1/15 second to make sure that the command is still active. During this time, it also computes the differential speed and the direction of rotation. If the differential speed is less than 14.3 RPM, microcomputer controller 580 assumes that overload apparatus 14 is essentially at rest and applies air pressure to it without engaging clutch 12. Overload apparatus 14 may then be manually engaged so that the home-position can be set by pressing zero switch 625. zero switch 625 only needs to be pressed when the electronics of device 10 are first powered up or when the home position has been lost because of an encoder fault. If the differential speed is greater than 14.3 RPM and the home position has been set, microcomputer controller 580 applies air pressure to clutch 12 and enters a digital control loop. If the home position has not been set or has been lost, the engage command is ignored.

The digital control loop operates as follows. Every time position counter 650 advances one count (increments if the balls of overload apparatus 14 are moving clockwise with respect to the detents, decrements if the balls of overload apparatus 14 are moving counterclockwise with respect to the detents), microcomputer controller 580 compares the actual angular velocity of the balls with respect to the detents to the desired angular velocity from a velocity profile stored in a look-up table in program memory. The velocity profile represents the desired angular velocity, as a function of angular position, for the final revolution of clutch slipping. If the actual velocity is greater than the desired velocity, microcomputer controller 580 opens valve 24 of clutch 12. If the actual velocity is less than the desired velocity, microcomputer controller 580 closes valve 24 of clutch 12. Angular velocity is expressed in terms of the time interval, in microseconds, between successive transitions of position counter 650. The desired velocity profile is based on a constant angular acceleration of $-1$ rev/sec$^2$ until the velocity drops to 1/16 rev/sec (3.75 RPM) at an angular position 16 counts (1/16 rev) from the home position. The velocity is then held constant at 3.75 RPM until 2 counts before reaching the home position. At this point, if the actual velocity does not exceed 14.3 RPM, valve 26 of overload apparatus 14 is opened and valve 24 of clutch 12 is closed. After a 0.25 second delay to allow the balls to settle in the detents of overload apparatus 14, overload apparatus 14 should be engaged and microcomputer controller 580 begins looking for an overload. Microcomputer controller 580 does this by constantly monitoring position counter 650 to make sure it does not fall outside an error band centered on the home position. If it does, microcomputer controller 580 exhausts the air from overload apparatus 14 and turns on overload indicator 621.

To operate device 10 of the present invention, certain procedures are of course desirable. For example, it has been explained that switch 625 of FIG. 5 is pushed once to set the zero position of overload apparatus 14. Similarly, toggle switch 630 of FIG. 5 is moved from an "on" position for engagement to a "off" position for disengagement. When an "off" to "on" transition is detected by microcomputer controller 580, it waits approximately 1/15 second to debounce the signal and compute the magnitude and direction of the differential speed. If the differential speed is less than 14.3 RPM, in the preferred form microcomputer controller 580 will apply air pressure through the controlling valve 26 for overload apparatus 14 without engaging clutch 12. Overload apparatus 14 may then be manually engaged. If the differential speed is greater than 14.3 RPM, microcomputer controller 580 opens clutch valve 24 and then pulse width modulates the clutch pressure during the final revolution of clutch slipping so as to control the relative velocity of the balls of overload apparatus 14 as they approach the detents, i.e. home position. At 1/128 revolution before reaching the home position, microcomputer controller 580 applies air pressure to overload apparatus 14 through valve 26 and the air pressure is exhausted from clutch 12. At this point, overload apparatus 14 should be engaged properly. The engagement sequence may be aborted at any time by moving toggle switch 630 to the "off" position.

Next, the zero command may be actuated. This command tells microcomputer controller 580 that overload apparatus 14 is engaged. It is used to set the home position after device 10 has been powered-up, and it is activated by the operator or logic device only after overload apparatus 14 has been properly engaged. The zero command is given by pressing switch 625. As long as device 10 is powered-up, microcomputer controller 580 will know the position of the balls of overload apparatus 14 with respect to the detents. During normal operation (differential speed greater than 14.3 RPM in the preferred form), the zero command as provided by switch 625 may be ignored.

Next, overload sensitivity may be set by engaging or disengaging switch 631 shown in FIG. 5. When pin P0.2 on microcomputer controller 580 is grounded with a jumper wire, the low sensitivity setting is selected. When the jumper wire is removed, the high sensitivity setting is selected. Use of the high sensitivity setting is desirable unless nuisance trip-outs occur.

Next, the ready indicator light, indicator light 712 on FIG. 5, must be on before device 10 is ready to receive an engage command from switch 630. In order for the ready indicator lamp 712 to be lit, the following must be true. First, no fault lamps may be lit. Fault lamps are such as 621, 622, 623, and 624. Next, toggle switch 630 must be in the disengage position. Last, the home position must be set, as previously described. When these three conditions exist, the ready indicator light 712 will indicate green.

Next, overload apparatus 14 status indicator 620 should be investigated. Indicator lamp 620 is lit whenever overload apparatus 14 is engaged. This means that the balls are seated in the detents, not just that air pressure is being applied to overload apparatus 14.

Lamp 621 is lit whenever there has been a disengagement of overload apparatus 14 as the result of an overload condition. The overload condition is cleared by moving toggle switch 630 to the disengage position and re-engaging toggle switch 630.

Indicator 685 is lit whenever valve 24 associated with clutch 12 is turned on. During the final revolution of clutch slipping, indicator 685 will flash on and off as the pulse width of microcomputer controller 580 modulates the clutch pressure.

Overload apparatus 14 limiter valve indicator 686 is lit whenever valve 26 associated with overload apparatus 14 is turned on. Indicator 686 being lit does not necessarily mean that overload apparatus 14 is engaged.

Indicator 622 is lit when microcomputer controller 580 detects an illegal state transition in the quadrature signals coming from codewheels 500 and 501 of slotted optical switches 502-505. This fault indicates a serious hardware problem, such as a damaged or misaligned slotted optical switch, dirt or other obstruction in the gap of a slotted optical switch 502-505, a damaged codewheel 500 or 501, or a faulty electrical connection between slotted optical switches 502-505 and microcomputer controller 580. Unfortunately, it is impossible for microcomputer controller 580 to detect every type of encoder error that could possibly occur, and certain encoder errors may be interpreted as an overload by microcomputer controller 580. The encoders have, however, been found to be very reliable. If an encoder fault does occur, it cannot be cleared simply by moving toggle switch 630 to the disengage position because the home position may have been lost. The operator must stop device 10, manually engage overload apparatus 14, set the home position again by pressing switch 625, and restart device 10.

Output encoder fault indicator 623 is lit when microcomputer controller 580 detects an illegal state transition in the quadrature signals coming from output codewheel slotted optical switches 504 and 505.

Drag fault indicator 624 is lit when, in the manual engagement mode with air pressure applied to overload apparatus 14, the differential speed in either direction of rotation exceeds 14.3 RPM in the preferred form. This feature protects overload apparatus 14 from ratcheting and provides overload protection even if overload apparatus 14 is disengaged and the home position has not been set. This fault is cleared by moving toggle switch 630 to the disengage position and re-engaging.

Clutch engagement time-out fault indicator 625 is lit if overload apparatus 14 has failed to engage after 16.7 seconds of clutch slipping in the preferred form. This feature protects clutch 12 from overheating as a result of excessive slipping caused by malfunction, a leak in the air line to clutch 12, or the pressure regulator of valve 24 for clutch 12 being set too low for the load. This fault is cleared by moving toggle switch 630 from the engage to the disengage position and re-engaging.

If any of the above faults occur, microcomputer controller 580 will immediately disconnect output 18 from input 16 by exhausting the air from both of valves 24 and 26 for clutch 12 and overload apparatus 14. This exhausting of air will occur even if toggle switch 630 is still in the engage position.

One preferred method of operating device 10 of the present invention may now be explained. First, after insuring that all is wired properly according to the Figures, it is recommended that the DC power be applied to device 10 which will light all of the indicator lamps except for lamps 685 and 686. Display 650 will display FF. If a valid reset has occurred, all of the indicator lamps will then turn off and the display will show 00.

The next step is to set the home position. To do this, first set overload apparatus 14 regulator to an appropriate pressure so overload apparatus 14 can be rotated by hand while air is applied. Then toggle switch 630 may be moved to the engage position. Overload status indicator lamp 620 should light, and you should hear a loud click as overload apparatus 14 valve 26 opens and air enters overload apparatus 14. Now, with air pressure applied to overload apparatus 14, slowly rotate input 16 with respect to output 18 until the balls drop into the detents. If you rotate too fast, you will trigger an overload drag fault, indicator 624 will become lit, and the air will be exhausted from overload apparatus 14. If this happens, move toggle switch 630 to the disengage position and back to the engage position, then resume the search for the home position. Once you have found the home position, and with toggle switch 630 still in the engage position, press switch 625, the zero position button. At this point, indicator 626 will light. If toggle switch 630 is then moved to the disengage position, overload status indicator 620 and overload valve indicator 686 will both turn off, and green ready indicator 712 will light. If toggle switch 630 is then moved to the disengage position, overload apparatus 14 status indicator 620 and overload valve indicator 686 will both turn off and green ready indicator 712 will turn on. With overload apparatus 14 engaged, it should be possible to rotate output 18 one full revolution in either direction without triggering an overload. If this test fails, it is best to reset the home position by again manually engaging overload apparatus 14 and pressing momentary switch 625. When the test is passed, device 10 is ready for operation and will require no further adjustments as long as power is maintained.

The reason the home position must sometimes be reset during installation is as follows. Inside microcomputer controller 580 there is an 8-bit register used as a position counter and read by display 650. This register keeps track of the angular position of the balls with respect to the detents with a resolution of 1 part in 256. In theory, the position counter should always be equal to zero as long as overload apparatus 14 is engaged. However, for this to be true, both codewheels 500 and 501 would have to be perfect. Since these requirements are difficult if not impossible to achieve, it has been found that position counter 650 is equal to zero plus or minus one count as engaged overload apparatus 14 is rotated. Now, when overload apparatus 14 is engaged and the home position has been set, microcomputer controller 580 constantly monitors position counter 650 to make sure it is always equal to zero plus or minus some tolerances. For high sensitivity settings, this tolerance is equal to plus or minus one count; for low sensitivity settings, this tolerance is equal to plus or minus two counts; for the high sensitivity setting, position counter 650 must always be equal to 255, 0, or 1 (the error band) because, if it is not, microcomputer controller 580 thinks the balls are starting to roll out of the detents and interrupts the sequence as an overload condition.

Position counter 650 must be at the midpoint of the error band at the moment zero set switch 625 is pressed. This may be explained as follows. Suppose that when zero set switch 625 is pressed, codewheels 500 and 501 just happen to be oriented so that position counter 650 is not at the center of the error band. When engaged overload apparatus 14 is then rotated, position counter 650 is going to read either 0 plus 2 counts or 0 minus 2 counts, depending on which end of the error band exists when zero set switch 625 was pressed. To microcomputer controller 580, this will appear to be an overload condition. Clearly, for proper operation, position counter 650 must be at the midpoint of the error band at the moment zero set switch 625 is pressed. The better the encoder, the more likely this is to occur.

Figure 6:
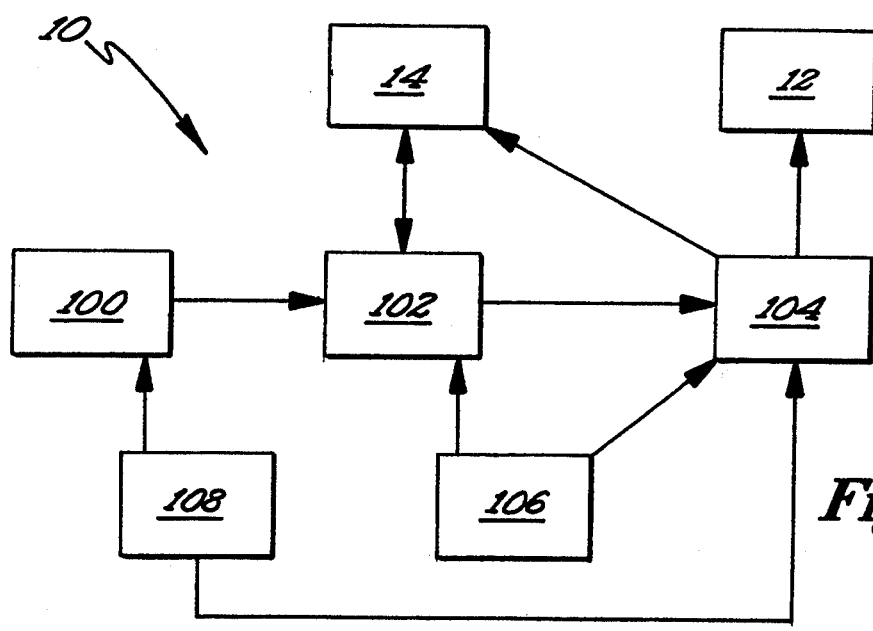
FIG. 6 shows a block diagram of the device of FIGS. 1 and 2.

In FIG. 6 a block diagram of the overall approach of the electronics according to the present invention may be explained. In this Figure, initialization block 100 assures that device 10 is in a preset state before beginning. With respect to the previous figures, initialization block 100 assures that valve 24 of clutch 12 causes clutch 12 to be disengaged; and valve 26 of overload apparatus 14 assures that overload apparatus 14 is disengaged. In the preferred embodiment, device 10 assures that there is no air applied to clutch 12 or overload apparatus 14.

Further, the initialization stage clears the home status position flag in the electronics to clearly indicate that the home position is not yet known.

The initialization stage also turns off all of the indicator lamps, in the preferred embodiment.

The initialization stage also configures all timers and establishes the interrupt priorities. The initialization stage then configures the interrupts and enables the interrupts.

The initialization stage also sets the past states of slotted optical switches 502-505 equal to their present states.

After that, the initialization stage waits for the disengage command, and will not proceed until a disengage command is received. The disengage command is received from switch 630 or its logical equivalent. This "wait" stage is a safety feature which prevents device 10 from starting up unexpectedly if, for example, a live shaft exists at input 16 when the electronics is powered-up. With this safety feature, device 10 will not engage either clutch 12 or overload apparatus 14 until the operator or other control device has gone to a disengage position and then to an engage position. The event that triggers start-up of device 10 is a transition from the disengage state to the engage state, a conscious, purposeful action.

After the system is initialized, the states of clutch 12 and overload apparatus 14 are detected by detection block 102. Detection block 102 constantly monitors the position of the balls of overload apparatus 14 with respect to its detents. Detection block 102 accomplishes this through the codewheels 500 and 501 in connection with their associated electronics, as previously explained. Detection block 102 monitors device 10, as previously explained in connection with the explanation of how to operate device 10.

Detection block 102 then provides a signal to engagement block 104 to engage overload apparatus 14 and clutch 12 of the preferred embodiment of the present invention in a manner also previously described.

Detection block 102 also provides a signal to feedback block 106 which also interrelates with engagement block 104 to engage or disengage overload apparatus 14 and/or clutch 12 in a manner hereinbefore explained.

Of course, operator/logic control block 108 is in control of the entire operation and may contain as little as switch 630 of FIG. 5.

FIG. 6 is exemplary of the overall operation of the system of the present invention and its most basic, block diagram form to merely illustrate the functional blocks associated with the explanation previously given.

Lastly, object code for microcomputer controller 580 follows and those skilled in the art will be aware of the use of this object code listing.

| LOC | OBJ |
|---|---|
| 0000 | 011D |
| 0003 | 4191 |
| 000B | |
| 000B | 6155 |
| 0013 | |
| 0013 | 41F3 |
| 001B | |
| 001B | 6190 |
| 001D | C200 |
| 001F | 758007 |
| 0022 | 75B00F |
| 0025 | 75829B |
| 0028 | 75F004 |
| 002B | 752380 |
| 002E | 752402 |
| 0031 | 75254B |
| 0034 | 752600 |
| 0037 | 758912 |
| 003A | 75B805 |
| 003D | E590 |
| 003F | 23 |
| 0040 | F590 |
| 0042 | 758815 |
| 0045 | 75A887 |
| 0048 | 3080FD |
| 004B | D2B0 |
| 004D | D2B1 |
| 004F | C283 |
| 0051 | C284 |
| 0053 | C285 |
| 0055 | 300008 |
| 0058 | E5B0 |
| 005A | 54F0 |
| 005C | 7002 |
| 005E | D283 |
| 0060 | 758107 |
| 0063 | C2AB |
| 0065 | C28E |
| 0067 | E4 |
| 0068 | F58B |
| 006A | F58D |
| 006C | D28E |
| 006E | 308FFD |
| 0071 | C28F |
| 0073 | C28E |
| 0075 | 2080FD |
| 0078 | C283 |
| 007A | 200010 |
| 007D | C2AF |
| 007F | 7590FF |
| 0082 | E590 |
| 0084 | 23 |
| 0085 | F590 |
| 0087 | 758815 |
| 008A | 75A887 |
| 008D | 852122 |
| 0090 | 758BC0 |
| 0093 | 758DE0 |
| 0096 | D28E |
| 0098 | 308FFD |
| 009B | C28F |
| 009D | C3 |
| 009E | E521 |
| 00A0 | 9522 |
| 00A2 | C201 |
| 00A4 | 30E704 |
| 00A7 | D201 |
| 00A9 | F4 |
| 00AA | 04 |
| 00AB | 54FC |
| 00AD | 6016 |
| 00AF | 308FFD |
| 00B2 | C28F |
| 00B4 | C28E |
| 00B6 | 200005 |
| 00B9 | 3080FD |
| 00BC | 014B |
| 00BE | 200102 |
| 00C1 | 218D |
| 00C3 | 21E4 |
| 00C5 | C28E |

-continued

| LOC | OBJ |
|---|---|
| 00C7 | 852122 |
| 00CA | E4 |
| 00CB | F58B |
| 00CD | F58D |
| 00CF | D28E |
| 00D1 | 308FFD |
| 00D4 | C28F |
| 00D6 | C28E |
| 00D8 | C3 |
| 00D9 | E521 |
| 00DB | 9522 |
| 00DD | C201 |
| 00DF | 30E704 |
| 00E2 | D201 |
| 00E4 | F4 |
| 00E5 | 04 |
| 00E6 | 54FC |
| 00E8 | 600D |
| 00EA | 200005 |
| 00ED | 3080FD |
| 00F0 | 014B |
| 00F2 | 2001CE |
| 00F5 | 218D |
| 00F7 | 308002 |
| 00FA | 014B |
| 00FC | C2B1 |
| 00FE | 852122 |
| 0101 | E4 |
| 0102 | F58B |
| 0104 | F58D |
| 0106 | D28E |
| 0108 | 20810F |
| 010B | C2AF |
| 010D | 752100 |
| 0110 | C2B4 |
| 0112 | C2B5 |
| 0114 | D200 |
| 0116 | D2AF |
| 0118 | 802C |
| 011A | 300010 |
| 011D | E521 |
| 011F | B4FF02 |
| 0122 | 8022 |
| 0124 | 7002 |
| 0126 | 801E |
| 0128 | B40102 |
| 012B | 8019 |
| 012D | 30BFD8 |
| 0130 | C28F |
| 0132 | C28E |
| 0134 | C3 |
| 0135 | E521 |
| 0137 | 9522 |
| 0139 | 30E702 |
| 013C | F4 |
| 013D | 04 |
| 013E | 54FC |
| 0140 | 60BC |
| 0142 | D2B6 |
| 0144 | 4180 |
| 0146 | D284 |
| 0148 | C28E |
| 014A | C28F |
| 014C | 758B7D |
| 014F | 758D2F |
| 0152 | D28E |
| 0154 | 7F04 |
| 0156 | 308FFD |
| 0159 | C28F |
| 015B | DFF9 |
| 015D | C28E |
| 015F | 208103 |
| 0162 | 752100 |
| 0165 | E521 |
| 0167 | B4FF02 |
| 016A | 80F3 |
| 016C | 7002 |
| 016E | 80EF |
| 0170 | B40102 |
| 0173 | 80EA |
| 0175 | 20820A |

-continued

| LOC | OBJ |
|---|---|
| 0178 | B4FE02 |
| 017B | 80E2 |
| 017D | B40202 |
| 0180 | B0DD |
| 0182 | C284 |
| 0184 | D285 |
| 0186 | D2B1 |
| 0188 | 3080FD |
| 018B | 014B |
| 018D | E4 |
| 018E | F58B |
| 0190 | F58D |
| 0192 | FC |
| 0193 | FD |
| 0194 | 308002 |
| 0197 | 014B |
| 0199 | C2B0 |
| 019B | D2AB |
| 019D | E521 |
| 019F | 04 |
| 01A0 | F8 |
| 01A1 | B521FD |
| 01A4 | D28E |
| 01A6 | 08 |
| 01A7 | E8 |
| 01A8 | B521FD |
| 01AB | C28E |
| 01AD | A98B |
| 01AF | AABD |
| 01B1 | 758B09 |
| 01B4 | 758D00 |
| 01B7 | D28E |
| 01B9 | 85F083 |
| 01BC | 10E702 |
| 01BF | 1583 |
| 01C1 | 23 |
| 01C2 | FB |
| 01C3 | 93 |
| 01C4 | CB |
| 01C5 | 04 |
| 01C6 | 93 |
| 01C7 | 99 |
| 01C8 | EB |
| 01C9 | 9A |
| 01CA | 92B0 |
| 01CC | E8 |
| 01CD | 2405 |
| 01CF | 4006 |
| 01D1 | 7C00 |
| 01D3 | 7D00 |
| 01D5 | 80CF |
| 01D7 | EA |
| 01D8 | 2C |
| 01D9 | FC |
| 01DA | E4 |
| 01DB | 3D |
| 01DC | FD |
| 01DD | B8FEC6 |
| 01E0 | 60C4 |
| 01E2 | 413B |
| 01E4 | E4 |
| 01E5 | F58B |
| 01E7 | F58D |
| 01E9 | FC |
| 01EA | FD |
| 01DB | 308002 |
| 01EE | 014B |
| 01F0 | C2B0 |
| 01F2 | D2AB |
| 01F4 | E521 |
| 01F6 | 14 |
| 01F7 | F8 |
| 01F8 | B521FD |
| 01FB | D28E |
| 01FD | 18 |
| 01FE | E8 |
| 01FF | B521FD |
| 0202 | C28E |
| 0204 | A98B |
| 0206 | AA8D |
| 0208 | 758B09 |

-continued

| LOC | OBJ |
|---|---|
| 020B | 758D00 |
| 020E | D28E |
| 0210 | F4 |
| 0211 | 04 |
| 0212 | 85F083 |
| 0215 | 10E702 |
| 0218 | 1583 |
| 021A | 23 |
| 021B | FB |
| 021C | 93 |
| 021D | CB |
| 021E | 04 |
| 021F | 93 |
| 0220 | 99 |
| 0221 | EB |
| 0222 | 9A |
| 0223 | 92B0 |
| 0225 | E8 |
| 0226 | 24FA |
| 0228 | 5006 |
| 022A | 7C00 |
| 022C | 7D00 |
| 022E | 80CD |
| 0230 | EA |
| 0231 | 2C |
| 0232 | FC |
| 0233 | E4 |
| 0234 | 3D |
| 0235 | FD |
| 0236 | B802C4 |
| 0239 | 60C2 |
| 023B | C2B1 |
| 023D | D2B0 |
| 023F | D284 |
| 0241 | C2AB |
| 0243 | C28E |
| 0245 | 758B7D |
| 0248 | 758D2F |
| 024B | D28E |
| 024D | 7E04 |
| 024F | 308FFD |
| 0252 | C28F |
| 0254 | DEF9 |
| 0256 | C28E |
| 0258 | E521 |
| 025A | B4FF02 |
| 025D | 80F9 |
| 025F | 7002 |
| 0261 | 80F5 |
| 0263 | B40102 |
| 0266 | 80F0 |
| 0268 | 20820A |
| 026B | B4FE02 |
| 026E | 80E8 |
| 0270 | B40202 |
| 0273 | 80E3 |
| 0275 | C284 |
| 0277 | D285 |
| 0279 | D2B1 |
| 027B | 3080FD |
| 027E | 014B |
| 0280 | C284 |
| 0282 | C285 |
| 0284 | D2B0 |
| 0286 | D2B1 |
| 0288 | 3080FD |
| 028B | C2B6 |
| 028D | C2B7 |
| 028F | 014B |
| 0291 | 20932A |
| 0294 | 209214 |
| 0297 | 209109 |
| 029A | 209001 |
| 029D | 32 |
| 029E | D291 |
| 02A0 | 0521 |
| 02A2 | 32 |
| 02A3 | 209004 |
| 02A6 | C291 |
| 02AB | 1521 |
| 02AA | 32 |
| 02AB | 209108 |
| 02AE | 209037 |
| 02B1 | D293 |
| 02B3 | 1521 |
| 02B5 | 32 |
| 02B6 | 30902F |
| 02B9 | D293 |
| 02BB | 0521 |
| 02BD | 32 |
| 02BE | 209213 |
| 02C1 | 209108 |
| 02C4 | 209021 |
| 02C7 | C293 |
| 02C9 | 0521 |
| 02CB | 32 |
| 02CC | 309019 |
| 02CF | C293 |
| 02D1 | 1521 |
| 02D3 | 32 |
| 02D4 | 209109 |
| 02D7 | 209001 |
| 02DA | 32 |
| 02DB | D291 |
| 02DD | 1521 |
| 02DF | 32 |
| 02E0 | 209004 |
| 02E3 | C291 |
| 02E5 | 0521 |
| 02E7 | 32 |
| 02E8 | C2A8 |
| 02EA | C200 |
| 02EC | D2B4 |
| 02EE | C023 |
| 02F0 | C024 |
| 02F2 | 32 |
| 02F3 | 20972A |
| 02F6 | 209614 |
| 02F9 | 209509 |
| 02FC | 209401 |
| 02FF | 32 |
| 0300 | D295 |
| 0302 | 1521 |
| 0304 | 32 |
| 0305 | 209404 |
| 0308 | C295 |
| 030A | 0521 |
| 030C | 32 |
| 030D | 209508 |
| 0310 | 209437 |
| 0313 | D297 |
| 0315 | 0521 |
| 0317 | 32 |
| 0318 | 30942F |
| 031B | D297 |
| 031D | 1521 |
| 031F | 32 |
| 0320 | 209613 |
| 0323 | 209508 |
| 0326 | 209421 |
| 0329 | C297 |
| 032B | 1521 |
| 032D | 32 |
| 032E | 309419 |
| 0331 | C297 |
| 0333 | 0521 |
| 0335 | 32 |
| 0336 | 209509 |
| 0339 | 209401 |
| 033C | 32 |
| 033D | D295 |
| 033F | 0521 |
| 0341 | 32 |
| 0342 | 209404 |
| 0345 | C295 |
| 0347 | 1521 |
| 0349 | 32 |
| 034A | C2AA |
| 034C | C200 |
| 034E | D2B5 |
| 0350 | C023 |
| 0352 | C024 |

-continued

| LOC | OBJ |
|---|---|
| 0354 | 32 |
| 0355 | C0E0 |
| 0357 | 200005 |
| 035A | 75A000 |
| 035D | 8003 |
| 035F | 8521A0 |
| 0362 | 30B007 |
| 0365 | E4 |
| 0366 | F527 |
| 0368 | F528 |
| 036A | 8013 |
| 036C | 0527 |
| 036E | E527 |
| 0370 | 700D |
| 0372 | 0528 |
| 0374 | E528 |
| 0376 | 7007 |
| 0378 | D2B7 |
| 037A | C023 |
| 037C | C024 |
| 037E | 32 |
| 037F | 308006 |
| 0382 | 30B006 |
| 0385 | 30B103 |
| 0388 | D0E0 |
| 038A | 32 |
| 038B | C025 |
| 028D | C026 |
| 038F | 32 |
| 0390 | C28E |
| 0392 | 758BFF |
| 0395 | 758DFF |
| 0398 | D2B0 |
| 039A | 32 |
| 039B | 0B25 |
| 039D | 0B2B |
| 039F | 0B31 |
| 03A1 | 0B37 |
| 03A3 | 0B3D |
| 03A5 | 0B43 |
| 03A7 | 0B49 |
| 03A9 | 0B4F |
| 03AB | 0B55 |
| 03AD | 0B5C |
| 03AF | 0B62 |
| 03B1 | 0B68 |
| 03B3 | 0B6F |
| 03B5 | 0B75 |
| 03B7 | 0B7C |
| 03B9 | 0B82 |
| 03BB | 0B89 |
| 03BD | 0B8F |
| 03BF | 0B96 |
| 03C1 | 0B9D |
| 03C3 | 0BA4 |
| 03C5 | 0BAA |
| 03C7 | 0BB1 |
| 03C9 | 0BB8 |
| 03CB | 0BBF |
| 03CD | 0BC6 |
| 03CF | 0BCD |
| 03D1 | 0BD4 |
| 03D3 | 0BDB |
| 03D5 | 0BE2 |
| 03D7 | 0BEA |
| 03D9 | 0BF1 |
| 03DB | 0BF8 |
| 03DD | 0C00 |
| 03DF | 0C07 |
| 03E1 | 0C0F |
| 03E3 | 0C16 |
| 03E5 | 0C1E |
| 03E7 | 0C25 |
| 03E9 | 0C2D |
| 03EB | 0C35 |
| 03ED | 0C3D |
| 03EF | 0C45 |
| 03F1 | 0C4D |
| 03F3 | 0C55 |
| 03F5 | 0C5D |
| 03F7 | 0C65 |

-continued

| LOC | OBJ |
|---|---|
| 03F9 | 0C6D |
| 03FB | 0C75 |
| 03FD | 0C7E |
| 03FF | 0C86 |
| 0401 | 0C8F |
| 0403 | 0C97 |
| 0405 | 0CA0 |
| 0407 | 0CAB |
| 0409 | 0CB1 |
| 040B | 0CBA |
| 040D | 0CC3 |
| 040F | 0CCC |
| 0411 | 0CD5 |
| 0413 | 0CDE |
| 0415 | 0CE7 |
| 0417 | 0CF0 |
| 0419 | 0CFA |
| 041B | 0D03 |
| 041D | 0D0D |
| 041F | 0D16 |
| 0421 | 0D20 |
| 0423 | 0D2A |
| 0F25 | 0D34 |
| 0427 | 0D3E |
| 0429 | 0D48 |
| 042B | 0D52 |
| 042D | 0D5C |
| 042F | 0D66 |
| 0431 | 0D71 |
| 0433 | 0D7B |
| 0435 | 0D86 |
| 0437 | 0D90 |
| 0439 | 0D9B |
| 043B | 0DA6 |
| 043D | 0DB1 |
| 043F | 0DBC |
| 0441 | 0DC7 |
| 0443 | 0DD2 |
| 0445 | 0DDE |
| 0447 | 0D39 |
| 0449 | 0DF5 |
| 044B | 0E01 |
| 044D | 0E0C |
| 044F | 0E18 |
| 0451 | 0E25 |
| 0453 | 0E31 |
| 0455 | 0E3D |
| 0457 | 0E4A |
| 0459 | 0E56 |
| 045B | 0E63 |
| 045D | 0E70 |
| 045F | 037D |
| 0461 | 0E8A |
| 0463 | 0E97 |
| 0465 | 0EA5 |
| 0467 | 0EB2 |
| 0469 | 0EC0 |
| 046B | 0ECE |
| 046D | 0EDC |
| 046F | 0EEA |
| 0471 | 0EF8 |
| 0473 | 0F07 |
| 0475 | 0F15 |
| 0477 | 0F24 |
| 0479 | 0F33 |
| 047B | 0F42 |
| 047D | 0F52 |
| 047F | 0F61 |
| 0481 | 0F71 |
| 0483 | 0F81 |
| 0485 | 0F91 |
| 0487 | 0FA1 |
| 0489 | 0FB2 |
| 048B | 0FC2 |
| 048D | 0FD3 |
| 048F | 0FE4 |
| 0491 | 0FF6 |
| 0493 | 1007 |
| 0495 | 1019 |
| 0497 | 102B |
| 0499 | 103D |

| LOC | OBJ |
|---|---|
| 049B | 1050 |
| 049D | 1063 |
| 049F | 1076 |
| 04A1 | 1089 |
| 04A3 | 109D |
| 04A5 | 10B0 |
| 04A7 | 10C5 |
| 04A9 | 10D9 |
| 04AB | 10EE |
| 04AD | 1103 |
| 04AF | 1118 |
| 04B1 | 112D |
| 04B3 | 1143 |
| 04B5 | 115A |
| 04B7 | 1170 |
| 04B9 | 1187 |
| 04BB | 119F |
| 04BD | 11B6 |
| 04BF | 11CE |
| 04C1 | 11E7 |
| 04C3 | 1200 |
| 04C5 | 1219 |
| 04C7 | 1232 |
| 04C9 | 124D |
| 04CB | 1267 |
| 04CD | 1282 |
| 0FCF | 129E |
| 04D1 | 12BA |
| 04D3 | 12D6 |
| 04D5 | 12F3 |
| 04D7 | 1310 |
| 04D9 | 132E |
| 04DB | 134D |
| 04DD | 136C |
| 04DF | 138C |
| 04E1 | 13AC |
| 04E3 | 13CD |
| 04E5 | 13EF |
| 04E7 | 1411 |
| 04E9 | 1435 |
| 04EB | 1458 |
| 04ED | 147D |
| 04EF | 14A2 |
| 04F1 | 14C8 |
| 04F3 | 14EF |
| 04F5 | 1517 |
| 04F7 | 1540 |
| 04F9 | 156A |
| 04FB | 1594 |
| 04FD | 15C0 |
| 04FF | 15ED |
| 0501 | 161A |
| 0503 | 1649 |
| 0505 | 167A |
| 0507 | 16AB |
| 0509 | 16DE |
| 050B | 1712 |
| 050D | 1747 |
| 050F | 177E |
| 0511 | 17B7 |
| 0513 | 17F1 |
| 0515 | 182C |
| 0517 | 186A |
| 0519 | 18A9 |
| 051B | 18EB |
| 051D | 192E |
| 051F | 1974 |
| 0521 | 19BC |
| 0523 | 1A07 |
| 0525 | 1A54 |
| 0527 | 1AA3 |
| 0529 | 1AF6 |
| 052B | 1B4C |
| 052D | 1BA5 |
| 052F | 1C01 |
| 0531 | 1C61 |
| 0533 | 1CC6 |
| 0535 | 1D2E |
| 0537 | 1D9B |
| 0539 | 1E0D |
| 053B | 1E85 |
| 053D | 1F02 |
| 053F | 1F85 |
| 0541 | 200F |
| 0543 | 20A0 |
| 0545 | 2139 |
| 0547 | 21DB |
| 0549 | 2287 |
| 054B | 233D |
| 054D | 23FF |
| 054F | 24CE |
| 0551 | 25AC |
| 0553 | 269A |
| 0555 | 279B |
| 0557 | 28B1 |
| 0559 | 29DF |
| 055B | 2B29 |
| 055D | 2C93 |
| 055F | 2E23 |
| 0561 | 2FE1 |
| 0563 | 31D6 |
| 0565 | 340D |
| 0567 | 3697 |
| 0569 | 398B |
| 056B | 3D09 |
| 056D | 4140 |
| 056F | 467A |
| 0571 | 4D34 |
| 0573 | 5651 |
| 0575 | 63AC |
| 0577 | 7A12 |
| 0579 | ACA2 |
| 057B | F424 |
| 057D | F424 |
| 057F | F424 |
| 0581 | F424 |
| 0583 | F424 |
| 0585 | F424 |
| 0587 | F424 |
| 0589 | F424 |
| 058B | F424 |
| 058D | F424 |
| 058F | F424 |
| 0591 | F424 |
| 0593 | F424 |
| 0595 | F424 |
| 0597 | F424 |
| 0599 | F424 |

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for connecting and disconnecting a rotatable output to and from a rotatable input for transferring rotational motion between the input and the output, and while at least one of the input and output is continuously rotating, comprising, in combination: a first rotational control apparatus for selectively rotating the output independent of the relative rotational positions of the input and the output; a second rotational control apparatus for selectively rotatably relating the input and the output at select rotational positions of the input relative to the output; first means for detecting the rotational position of the input; second means for detecting the rotational position of the output; and means for controlling actuation of the first and second rotational control apparatus in response to the rotational positions of the input and the output as detected by the first and second detecting means allowing the first rotational control apparatus to rotate the output while the second rotational control apparatus is not actuated and to bring the output to general alignment with the input at the select rotational position of the second rotational control apparatus at which time the second rotational control apparatus is actuated to rotatably relate the input and the output at least at one select rotational position.

2. The apparatus of claim 1 wherein the second rotational control apparatus provides overload protection between the input and the output, and actuation of the first rotational control apparatus is removed when the second rotational control apparatus is actuated.

3. The apparatus of claim 2 wherein the actuation controlling means removes the actuation of the second rotational control apparatus when the first and second detecting means detect relative rotation of the input and the output from the select rotational position.

4. The apparatus of claim 3 wherein the first rotational control apparatus and the second rotational control apparatus are independently actuated utilizing fluid pressure; and wherein the actuation controlling means includes valve means for selectively providing fluid pressure independently to the first rotational control apparatus and to the second rotational control apparatus.

5. The apparatus of claim 1 wherein the actuation controlling means is electronic and includes means for homing the input to the output to establish at least one known select rotational position of the input to the output.

6. The apparatus of claim 1 wherein the first rotational control apparatus and the second rotational control apparatus are independently actuated utilizing fluid pressure; and wherein the actuation controlling means includes valve means for selectively providing fluid pressure independently to the first rotational control apparatus and to the second rotational control apparatus.

7. The apparatus of claim 1 wherein the first and second rotational control apparatus are connected in parallel between the input and the output.

8. Apparatus for disconnecting a rotatable output transferring rotational motion from a rotatable input in the event of reaching a torque overload level comprising, in combination: an overload protection rotational control apparatus for selectively rotatably relating the input and the output at select rotational positions of the input relative to the output; first means for detecting the rotational position of the output; second means for detecting the rotational position of the output; and means for controlling actuation of the overload protection rotational control apparatus in response to the relative rotational positions of the input and the output as detected by the first and second detecting means allowing removal of the actuation of the overload protection rotational control apparatus when the first and second detecting means detect relative rotation of the input and the output from the select rotational position.

9. The apparatus of claim 8 wherein the overload protection rotational control apparatus is actuated utilizing fluid pressure; and wherein the controlling means includes valve means for selectively providing fluid pressure to the overload protection rotational control apparatus.

10. Method for connecting an output to an input at select rotational positions, with at least the input rotating at connection, comprising the steps of: homing the relative rotational positions of the input and the output at the select rotational positions; rotating the input; detecting the rotational position of the input; rotating the output by a first rotational control apparatus independent of the relative rotational positions of the input and the output; detecting the rotational position of the output; and rotatably relating the input to the output by a second rotational apparatus when the rotational positions of the input and the output are detected to be at the select rotational position, with the second rotational apparatus rotatably relating the input and the output at the select rotational position.

11. The method of claim 10 further comprising the step of disconnecting the output from the input in the event of reaching a torque overload level, with the disconnecting step comprising the steps of simultaneously deactuating the first rotational control apparatus at the actuation of the second rotational control apparatus; and further removing actuation of the second rotational control apparatus in the event that the input and output are detected as moving from the select rotational position.

12. The method of claim 10 wherein the step of rotating the output comprises the step of rotatably relating the input to the output through the first rotational control apparatus connected in parallel with the second rotational control apparatus between the input and the output.

13. Apparatus for connecting, transferring, and disconnecting rotational motion between a rotatable input and a rotatable output and while at least one of the input and the output is continuously rotating comprising, in combination: a clutch for rotating the output independent of the relative rotational positions of the input and the output; an overload protection apparatus for selectively rotatably relating the input and the output at select rotational positions of the input relative to the output; and electronic means for independently controlling actuation of the clutch and the overload protection apparatus, with the electronic actuation controlling means including: means for electronically detecting the relative rotational position between the input and the output; means for homing the relative rotational position between the input and the output at least at one of the select rotational positions; means for causing actuation of the clutch to rotate the output; means for causing actuation of the overload protection apparatus to rotatably relate the input and the output at the select rotational position when the output is brought to general alignment with the input in the select rotational position by the clutch; and means for removing actuation of the clutch and of the overload protection apparatus.

14. The apparatus of claim 13 wherein the actuation removing means includes means for removing actuation of the clutch when the overload protection apparatus is actuated; and means for removing the actuation of the overload protection apparatus when relative rotation of the input and the output from the select rotational position is detected.

15. The apparatus of claim 14 wherein the clutch and the overload protection apparatus are fluid pressure actuated; and wherein the actuation controlling means includes valve means for selectively providing fluid pressure independently to the clutch and to the overload protection apparatus.

16. The apparatus of claim 13 wherein the clutch and the overload protection apparatus are connected in parallel between the input and the output.

* * * * *

UNITED STATES PATENT AND TRADEMARK OFFICE
CERTIFICATE OF CORRECTION

PATENT NO. : 5,355,983

DATED : October 18, 1994

INVENTOR(S) : James V. Radomski et al.

It is certified that error appears in the above-identified patent and that said Letters Patent is hereby corrected as shown below:

Column 4, line 23, cancel "examples" and substitute therefor --example--.

Column 7, line 5, cancel "when" and substitute therefor --When--.

Column 7, line 16, cancel "home-position" and substitute therefor --home position--.

Column 7, line 17, cancel "zero" and substitute therefor --Zero--.

Column 21, line 52, cancel "output; second" and substitute therefor --input; second--.

Signed and Sealed this

Third Day of January, 1995

Attest:

BRUCE LEHMAN

*Attesting Officer*      *Commissioner of Patents and Trademarks*